US006763564B2

(12) United States Patent
Ilies (10) Patent No.: US 6,763,564 B2
(45) Date of Patent: Jul. 20, 2004

(54) AUTOMATED METHOD AND APPARATUS FOR DRIVING FASTENERS INTO AN ELECTRIC FAN ASSEMBLY

(75) Inventor: Andrei Ilies, Lincoln Wood, IL (US)

(73) Assignee: Lakewood Engineering and Manufacturing Co., Chicago, IL (US)

( * ) Notice: Subject to any disclaimer, the term of this patent is extended or adjusted under 35 U.S.C. 154(b) by 49 days.

(21) Appl. No.: 10/116,372

(22) Filed: Apr. 4, 2002

(65) Prior Publication Data

US 2003/0188412 A1 Oct. 9, 2003

(51) Int. Cl.⁷ ............................................... B23Q 17/00
(52) U.S. Cl. ..................... 29/407.02; 29/430; 29/464; 29/525.11; 29/714; 29/721; 29/787; 29/798
(58) Field of Search ............................ 29/889, 407.02, 29/407.1, 464, 432, 525.11, 525.12, 714, 716, 720, 721, 798, 787, 784, 791, 799, 430, 456, 888.025; 416/247 R; 227/30, 40, 43, 99, 153

(56) References Cited

U.S. PATENT DOCUMENTS

| | | |
|---|---|---|
| 3,583,451 A | 6/1971 | Dixon |
| 3,642,039 A | 2/1972 | McGee |
| 3,930,808 A | 1/1976 | Miller et al. |
| 4,058,884 A | 11/1977 | Lydon et al. |
| 4,084,491 A * | 4/1978 | Spotts et al. ................. 454/285 |
| 4,294,142 A | 10/1981 | Sugahara et al. |
| 4,403,388 A * | 9/1983 | Belcher ......................... 29/798 |
| 4,418,765 A | 12/1983 | Mori et al. |
| 4,562,756 A | 1/1986 | Otsuki et al. |
| 4,672,866 A | 6/1987 | Riera et al. |
| 4,685,050 A | 8/1987 | Polzer et al. |
| 4,777,851 A | 10/1988 | Gubitose |
| 4,793,540 A * | 12/1988 | Mangan et al. ............... 29/432 |
| 4,888,539 A | 12/1989 | Estabrook et al. |
| 4,921,009 A | 5/1990 | Adam |
| 5,186,084 A | 2/1993 | Totsu |
| 5,222,290 A | 6/1993 | Kyalheim |
| 5,229,931 A | 7/1993 | Takeshima et al. |
| 5,231,902 A | 8/1993 | Uno et al. |
| 5,249,352 A * | 10/1993 | Landers ........................ 29/432 |
| 5,331,732 A | 7/1994 | Kyalheim |
| 5,375,315 A * | 12/1994 | Griffith et al. ................ 29/432 |
| 5,398,616 A | 3/1995 | Eidemanis et al. |
| 5,423,371 A | 6/1995 | Landua et al. |
| 5,555,617 A * | 9/1996 | Pope ............................. 29/798 |
| 5,675,887 A * | 10/1997 | Gajewski et al. ............. 29/720 |
| 5,682,800 A | 11/1997 | Jore |
| 6,015,265 A * | 1/2000 | Lasko et al. ............ 416/247 R |
| 6,017,008 A | 1/2000 | Farley |
| 6,055,484 A | 4/2000 | Lysaght |
| 6,076,254 A * | 6/2000 | Onodera et al. ............... 29/714 |
| 6,105,475 A | 8/2000 | Ohmi et al. |
| 6,279,224 B1 * | 8/2001 | Wirtz et al. .................... 29/791 |
| 6,499,206 B1 * | 12/2002 | Eure et al. ..................... 29/430 |
| 2001/0018027 A1 * | 8/2001 | Chen ........................ 417/423.7 |

* cited by examiner

Primary Examiner—David P. Bryant
(74) Attorney, Agent, or Firm—Wallenstein Wagner & Rockey, Ltd.

(57) ABSTRACT

An apparatus and method for assembling a fan grill to a shroud of a fan housing. The apparatus includes a support structure having a moveable carriage disposed in a horizontal plane. The moveable carriage is adapted to align and carry the fan grill and shroud combination. A clamping structure is moveably attached to the support structure and has clamps adapted to clamp the fan grill and shroud combination in a fixed position. A plurality of automatic drivers attached to the clamping structure are moveable in a direction transverse to the horizontal plane of the carriage. The automatic drivers drive a plurality of fasteners into the fan grill and shroud combination. The moveable carriage may be adapted to carry more than one fan grill and shroud combination to allow an operator to load a second fan grill and shroud combination onto the carriage while a first fan grill and shroud combination is engaged by the drivers. Each of the automatic drivers are capable of being independently controllable in relation to each other via a control system.

34 Claims, 8 Drawing Sheets

AUTOMATED METHOD AND APPARATUS FOR DRIVING FASTENERS INTO AN ELECTRIC FAN ASSEMBLY

TECHNICAL FIELD

The present invention relates to an automated manufacturing process, and more specifically to an automated method and apparatus for driving fasteners into an electric fan assembly.

BACKGROUND OF THE INVENTION

Many types of electric fans comprise a fan motor and fan blade assembly that are housed within a housing that includes a peripheral shroud of a generally flat material, such as sheet metal, to create an outer peripheral surface of the housing. The shroud is typically formed into a generally square-shaped periphery, leaving a front portion and a rear portion of the housing open. To enclose the housing, a generally planar front and rear grill are attached to the shroud. The grills are typically made of a plastic material and include a peripheral lip portion generally transverse to the grill plane that provides a planar surface through which the fasteners may be driven. Likewise, the shroud also includes a peripheral lip portion, or flange, to provide material to accommodate the fasteners.

Typical fan assembly processes require a worker to lay each grill onto the housing and align the grill to the housing by sight. To fasten each grill to the housing, a worker, typically using a hand held automatic screw driver, drives screws into the grill and housing around the periphery of the housing. In square-shaped fan housings, this typically involves driving a total of six screws per side of the square periphery.

When the worker initially begins driving each screw, some initial pressure needs to be applied to facilitate penetration of the screw into the lip portion of the grill. Thereafter, each screw moves relatively easily though the grill material, especially when the material is a plastic material. However, when each screw reaches the metal material of the housing, the worker typically needs to add additional pressure, or continue applying sufficient pressure, to allow the screw to pierce the metal. Threads of each of the screws then engage the metal, and the worker continues to apply pressure until the screw has sufficiently engaged both the grill and the metal shroud. The worker then repeats this same process to complete the assembly for each grill.

This manual process is time consuming and increases labor costs significantly, especially when the large quantities of fans are being assembled. Other disadvantages come to mind in utilizing human labor for such a significant amount of driving, including human error and possible injuries. While the manual process does allow for a certain level of torque control, especially when penetrating multiple layers of differing material having different properties, the torque control still remains subjective and vulnerable to error. The lack of consistent control over the torque and penetration of the fasteners, exacerbated by the application of multiple material types, creates a significant challenge to both manual and automated processes.

Some automated processes are well-known in the art. For example, U.S. Pat. No. 4,672,866, to Riera et al. and entitled "Automatic Fastener System With Fastener Detection Means," discloses an automatic fastener driving system suitable for robotic applications utilizing a modified fastener driver having a detection mechanism in the head of the driver working in combination with a pneumatically operated advance and retract mechanism, and control circuitry, to detect when a fastener is present in the driver, to advance and drive the fastener into the workpiece, and to then automatically retract therefrom. The driving system uses a fastener detecting means which is capable of providing a signal when a screw, or other fastener, is present. In addition, a slide system is provided to advance and retract the driver head. Both of these features are operated by a suitable control means to accomplish this functionality. However, this arrangement does not allow the torque load to be preset and does not sufficiently control the torque of the drivers during various stages of screw penetration.

U.S. Pat. No. 5,229,931 to Takeshima, entitled "Nut Runner Control System and Method of Monitoring Nut Runners," discloses a means to prevent the torques of each fastener from varying with respect to each other. This function is accomplished by driving the fasteners to a preliminary torque level which is slightly less than the desired torque level. When the preliminary torque level has been reached, the drivers are temporarily stopped and then restarted after a certain period of time. While some level of torque control is provided, this arrangement does not prevent over tightening and stripping because it does not sufficiently control the torque of the drivers near the final stage of screw penetration. Because of the multi-material construction presented by fan assemblies, such control is extremely important to prevent overtorquing, stripping and defective or incomplete screw penetration.

The present invention offers a solution to these and other problems by providing a means for reducing the pneumatic pressure supplied to the driver at a gradual rate so that the velocity of the fastener reduces over time, thereby mechanically simulating manual tightening.

The present invention also provides an assembly apparatus particularly suitable for fast, efficient and accurate assembly of grills to shrouds of a fan housing.

Other features and advantages will be apparent to those skilled in the art after review of the description herein.

SUMMARY OF THE INVENTION

An apparatus and method for assembling a fan grill to a shroud of a fan housing. The apparatus includes a support structure having a moveable carriage disposed in a horizontal plane. The moveable carriage is adapted to align and carry the fan grill and shroud combination. A clamping structure is moveably attached to the support structure and has clamps adapted to clamp the fan grill and shroud combination in a fixed position. A plurality of automatic drivers attached to the clamping structure are moveable in a direction transverse to the horizontal plane of the carriage. The automatic drivers drive a plurality of fasteners into the fan grill and shroud combination.

According to a particular aspect of the invention, the moveable carriage is adapted to carry more than one fan grill and shroud combination to allow an operator to load a second fan grill and shroud combination onto the carriage while a first fan grill and shroud combination is engaged by the drivers.

According to another particular aspect of the invention, the fan grill and shroud combination includes a second fan grill and the apparatus further includes a second plurality of automatic drivers and clamps attached to the clamping structure. The second plurality of drivers are moveable in a direction transverse to the horizontal plane of the carriage to drive a plurality of fasteners into the second fan grill and shroud.

According to another particular aspect of the invention, each of the automatic drivers are independently controllable in relation to each other via a control system.

According to another particular aspect of the invention, the apparatus includes a control system that is capable of controlling torque of a pneumatic driver. A canister having a fixed volume is in selective communication with an air source in communication with the driver. An adjustable air regulator is connected to the canister and a sensor is connected to the pneumatic driver. The sensor is in communication with the control system and communicates with the control system to terminate communication of air flow to the cannister upon penetration of the fasteners into the fan shroud. The air regulator regulates a flow rate of air from the canister to the pneumatic driver upon termination of air flow to the cannister, thereby regulating torque generated by the pneumatic driver in relation to the regulation of the flow rate of air from the canister.

According to yet another aspect of the invention, a sensor is in communication with at least one of the automatic drivers, wherein the sensor capable of sensing a drive fault associated with at least one of the automatic drivers.

According to yet another aspect of the invention, the clamping structure comprises a first support mechanically linked to a second support. A first plurality of drivers are connected to the first support and a second plurality of drivers are connected to the second support, thereby facilitating simultaneous driving of fasteners in a first direction and a second direction, both directions transverse to the horizontal plane of the support structure.

These and other aspects will be apparent after reading the detailed description in conjunction with the drawings.

DETAILED DESCRIPTION OF THE PREFERRED EMBODIMENT

While this invention is susceptible of embodiment in many different forms, there is shown in the drawings and will herein be described in detail one or more preferred embodiments of the invention with the understanding that the present disclosure is to be considered as an exemplification of the principles of the invention and is not intended to limit the broad aspect of the invention to the embodiments illustrated.

It should also be noted that the drawings of the preferred embodiment include some details that may not be necessary with other embodiments of the present invention. The claims herein define the scope of the present invention and details in the drawings should not be construed as limitations of the claims.

Figure 1:
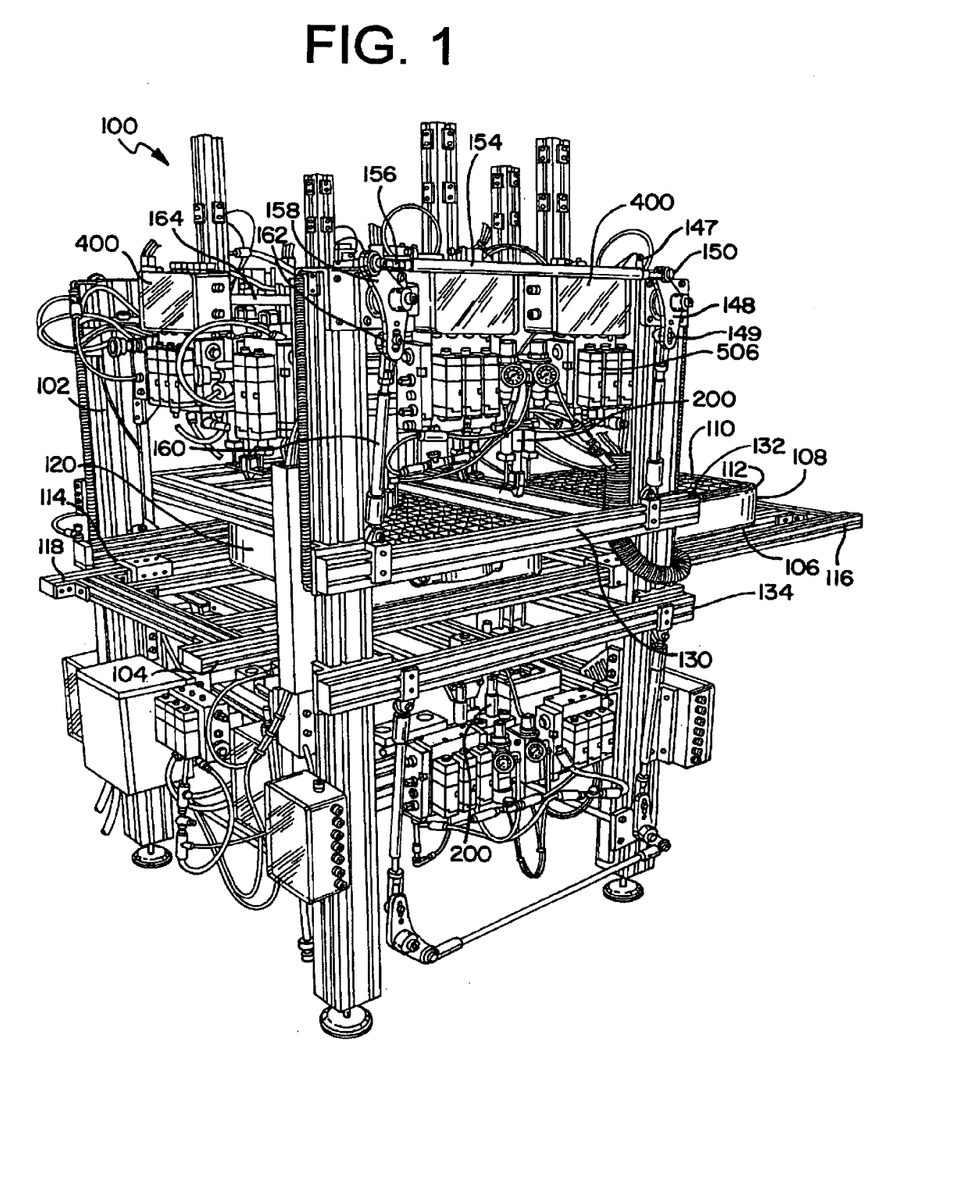
FIG. 1 is a perspective view of an embodiment in accordance with the present invention.
Figure 2:
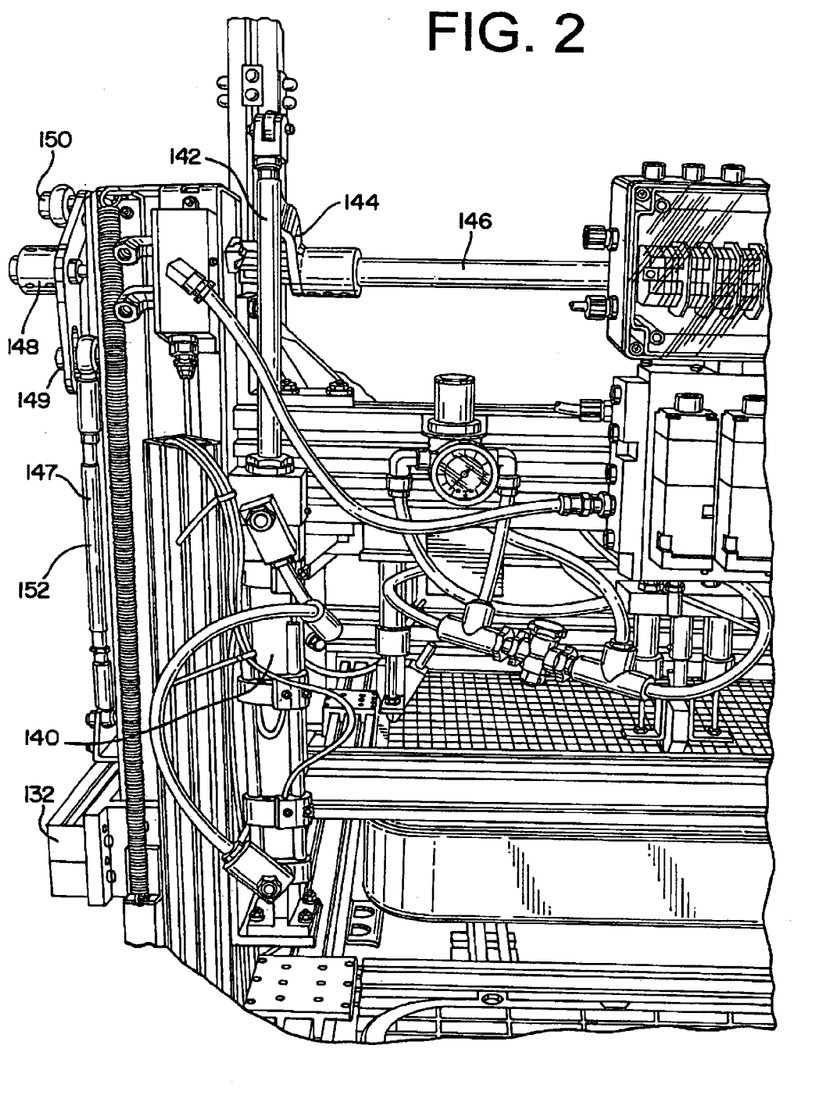
FIG. 2 is an enlarged partial perspective view of the embodiment of FIG. 1.

Referring to FIG. 1, an assembly apparatus 100 is shown as an embodiment in accordance with the present invention. The apparatus 100 includes a support structure 102 having a moveable carriage 104 disposed in a horizontal plane of the support structure 102. The carriage 104 is adapted to carry a first fan grill 106, a fan shroud 108, and a second fan grill 110 of a fan assembly 112. In a preferred embodiment as shown in FIGS. 1 and 2, the carriage 104 slides along the horizontal plane within one or more guides 114 such that a portion 116 of the carriage 104 is moved away from the support structure 102 to allow an operator to place the fan assembly 112 thereon. In a preferred embodiment, when the portion 116 of the carriage 104 is slid back such that the fan assembly 112 is within the support structure, a portion 118 of the carriage moves away from the support structure 102, which would allow an operator to place a second fan assembly 120 (which is similar to the fan assembly 112) on the carriage 104 while the fan assembly 112 is within the support structure 102. As shown in FIG. 1, the carriage 104 is positioned such that the second fan assembly 120 is positioned within the support structure 102 while the fan assembly 112 is positioned away from the support structure 102.

A clamping structure 130 is moveably attached to the support structure 102 in a direction transverse to the horizontal plane defined by the carriage 104. In a preferred embodiment, the clamping structure 130 includes a first substructure 132 and a second substructure 134, both of which move in a direction transverse to the horizontal plane defined by the carriage 104.

The movement of each of the substructures 132 and 134 is governed by an identical mechanical linkage system that will now be described. For purposes of simplicity and since the linkage system for both substructures is substantially identical, the linkage system for substructure 132 will be described in detail. As best shown in FIG. 2, a pneumatic cylinder member 140 includes a vertically moveable shaft 142 that engages a linkage member 144, which is attached to a horizontal shaft member 146. A sublinkage 147 includes a first generally L-shaped linkage member 148 that is centrally attached to an end of the shaft member 146 and includes a pair of linkage points 149 and 150, as shown in FIG. 2. A shaft 152 has one end attached to the linkage point 149 of the linkage member 148 and another end attached to the substructure 132, as shown in FIGS. 1 and 2. As shown in FIG. 1, one end of a horizontal shaft 154 is attached to the linkage point 150 of the linkage member 148. The other end of the horizontal shaft 154 is attached to a linkage point 156 of a second generally L-shaped linkage member 158, which is identical to the linkage member 148. In a similar arrangement to the shaft 152, a shaft 160 has one end attached to a linkage point 162 of the linkage member 158 and another end attached to the substructure 132, as shown in FIG. 1. The linkage member 158 is centrally disposed on a horizontal shaft member 164, as shown in FIG. 1.

A sublinkage identical to the sublinkage 147 described above and shown in FIG. 1 is attached to the other ends of horizontal shaft members 146 and 164, such that the substructure 132 is supported on the other side of the assembly apparatus 100. In operation, the pneumatic cylinder member 140 causes the vertically moveable shaft 142 to move and rotate the horizontal shaft member 146. This rotation also rotates the L-shaped linkage member 148, which causes the shaft 152 to move the substructure 132. Since the horizontal shaft 154 is also linked to the linkage member 148, the movement also causes the L-shaped linkage member 158 to rotate and cause the shaft 160 to move the substructure 132. Since both sublinkages are attached to the horizontal shaft members 146 and 164, both sublinkages move together to move the substructure 132 in a direction transverse to the horizontal plane defined by the carriage 104.

As noted above, the movement of the substructure 134 is governed by a similar linkage mechanism. When movement of the substructures 132 and 134 is coordinated by a control system, they are capable of simultaneously moving toward the carriage 104.

Figure 3:
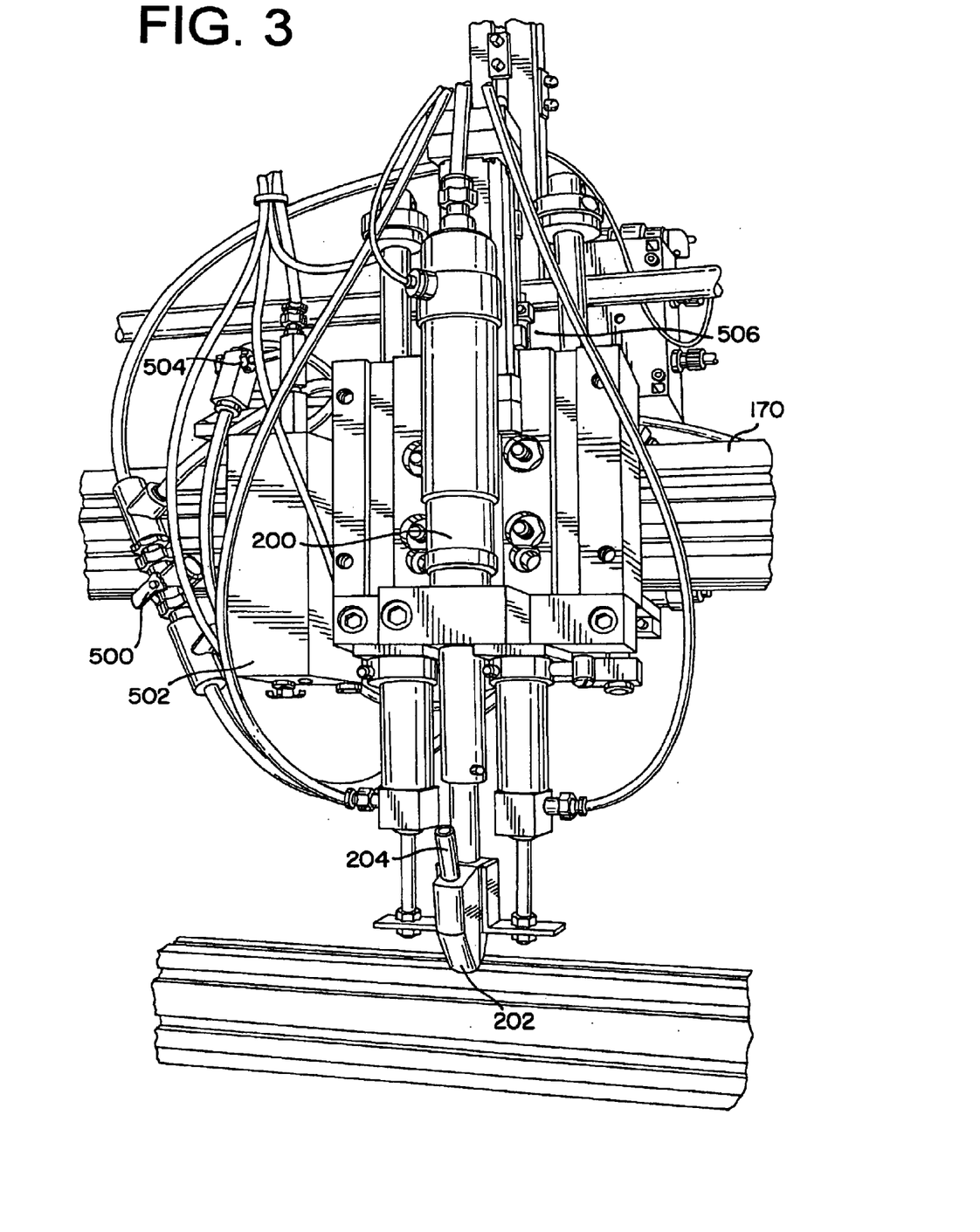
FIG. 3 is an enlarged partial perspective view of the embodiment of FIG. 1 showing a driver and a clamp in accordance with the present invention.
Figure 4:
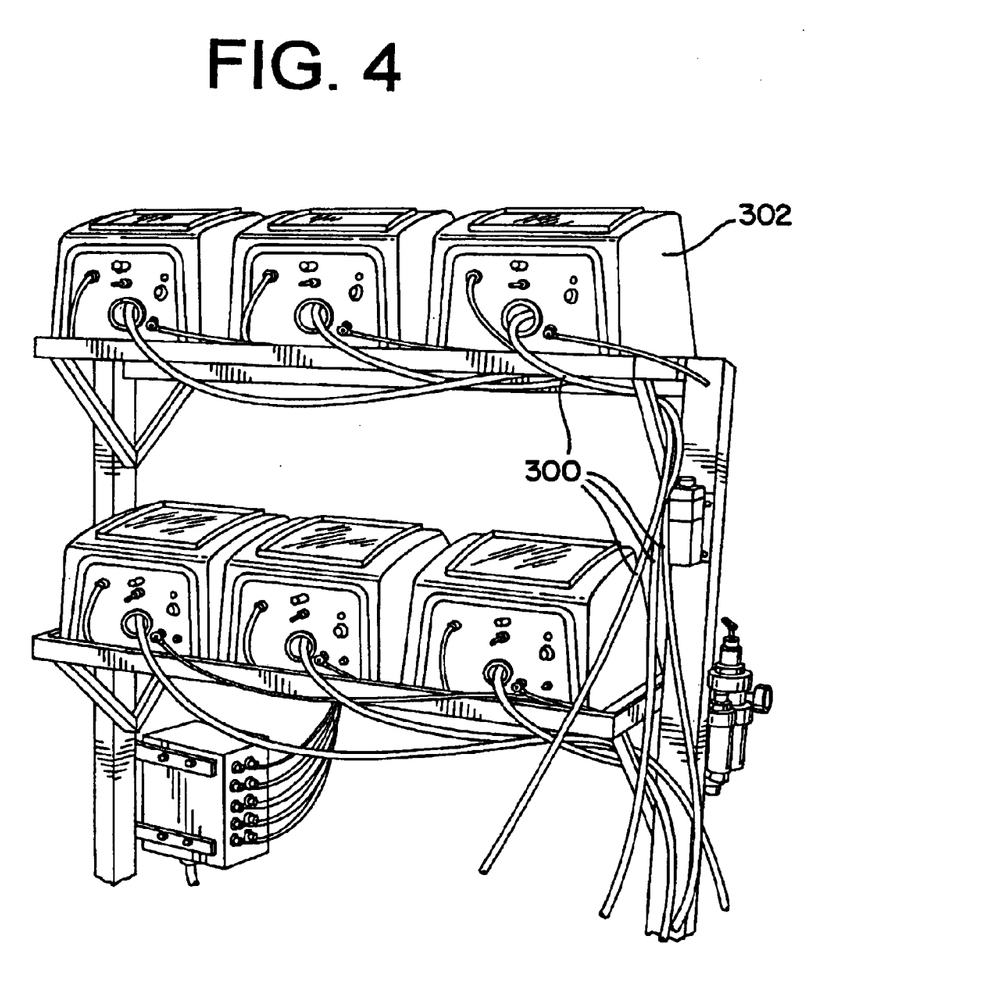
FIG. 4 is a perspective view of a plurality of fastener feeders for the drivers in accordance with an embodiment of the present invention.

A plurality of automatic drivers 200 are attached to a horizontal member 170 of the substructures 132 and 134, as shown in FIG. 2. In a preferred embodiment, the drivers 200 are pneumatic drivers. As shown in FIG. 3, each of the drivers 200 includes a clamp member 202 and a feeder connector 204. The clamp member 202 holds the fastener while the drivers 200 drive the fasteners into the fan assembly 112. The clamp member 202 also applies some tension to the fan grills 106 and 110 so that they are slightly stretched and can be properly fitted to the fan shroud 108. As shown in FIG. 4, a plurality of feeder tubes 300 are each connected to one of a plurality of automatic fastener feeders 302 and can be connected to the feeder connectors 204 of the drivers 200. Fasteners can then automatically be fed to the drivers 200 during the assembly process.

Figure 5:
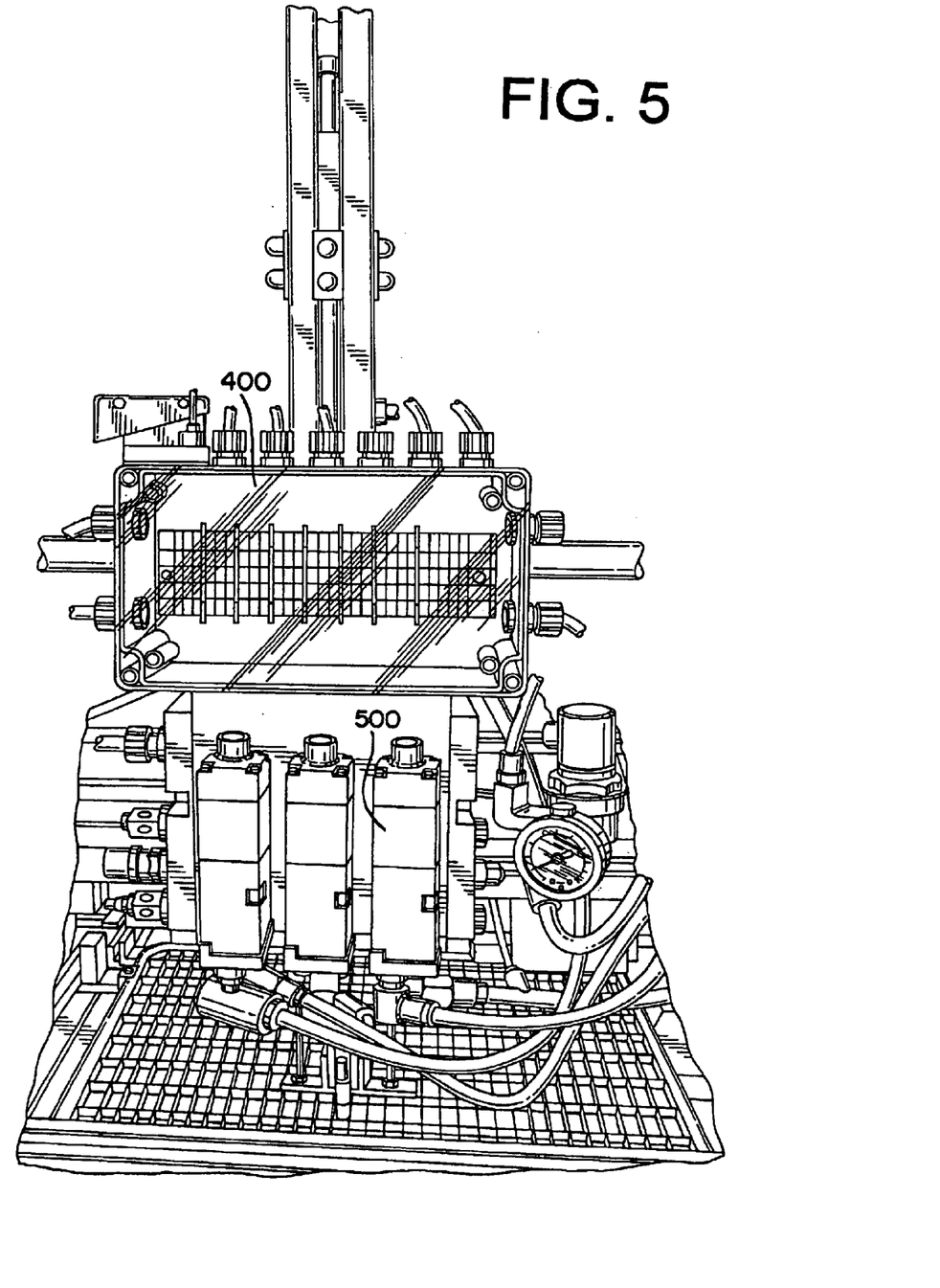
FIG. 5 is an enlarged partial perspective view of the embodiment of FIG. 1 showing a subcontroller assembly in accordance with the present invention.
Figure 6:
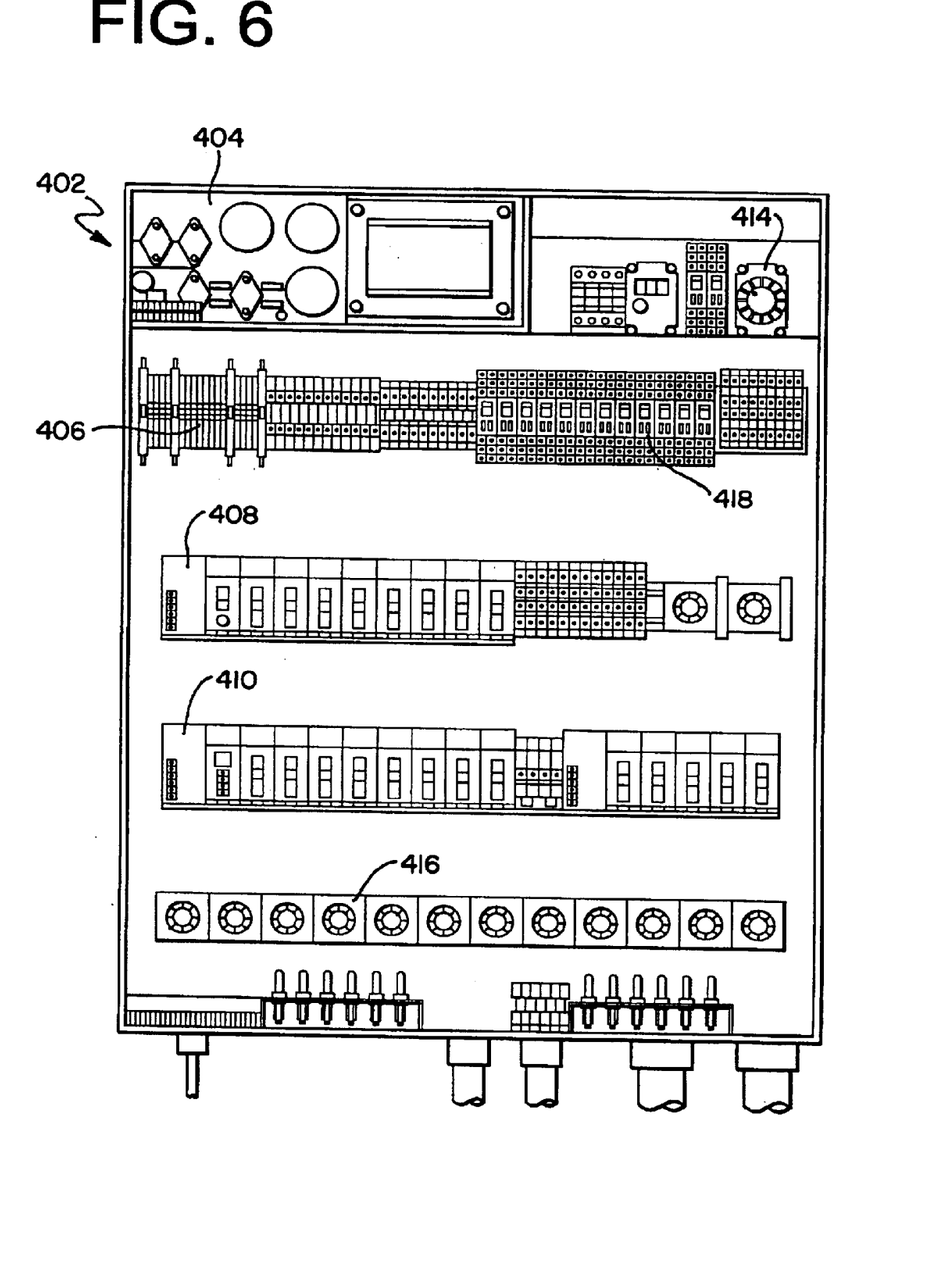
FIG. 6 is an enlarged partial perspective view of a master controller in accordance with the present invention.

The assembly apparatus 100 includes a control system comprising a plurality of terminals, or subcontrollers 400 (such as that shown in FIG. 5) electrically connected to a master controller 402 (shown in FIG. 6). Each of the drivers 200 is in electrical communication with and is individually controlled by one of the subcontrollers 400. The master controller 402 provides control of the drivers 200 with respect to each other. Thus, each of the drivers 200 are independently controllable in relation to each other. Control parameters for each of the subcontrollers 400, and hence each of the drivers 200, can be preset and modified via the master controller 402. The subcontrollers 400 may comprise a plurality of relays and/or terminals in communication with the master controller 402 and does not necessarily have to include a controller itself.

The master controller 402 consists of a power supply 404, a plurality of fuses 406, a plurality of input programable logic controllers 408, a plurality of output programable logic controllers 410, a central processing unit 412, a pre-programed function selector 414, a plurality of adjustable timers 416, and a plurality of relays 418. Each of the subcontrollers includes a plurality of relays.

The assembly apparatus 100 further includes a plurality of sensor groups and individual sensors each associated with one of the drivers 200. Each sensor group and individual sensor can detect various conditions during assembly and have various functions. One particular group of sensors is made up of magnetically-induced proximity sensors that are capable of detecting when a fastener has pierced the fan shroud 108. An additional pressure sensor is capable of detecting when the diver motor has cut off thereby signaling the end of the fastening process. A photoelectric sensor is capable of detecting when the fastener is properly located. Another photoelectric sensor is capable of detecting variations in height of the fan assembly 112. Another sensor is capable of sensing if a drive fault has occurred with the associated driver 200 and relaying a signal to the master controller or directly to an indicator to indicate the fault to an operator. In the event of such a fault the associated driver 200 will re-attempt driving a fastener into the fan assembly 100.

Figure 7:
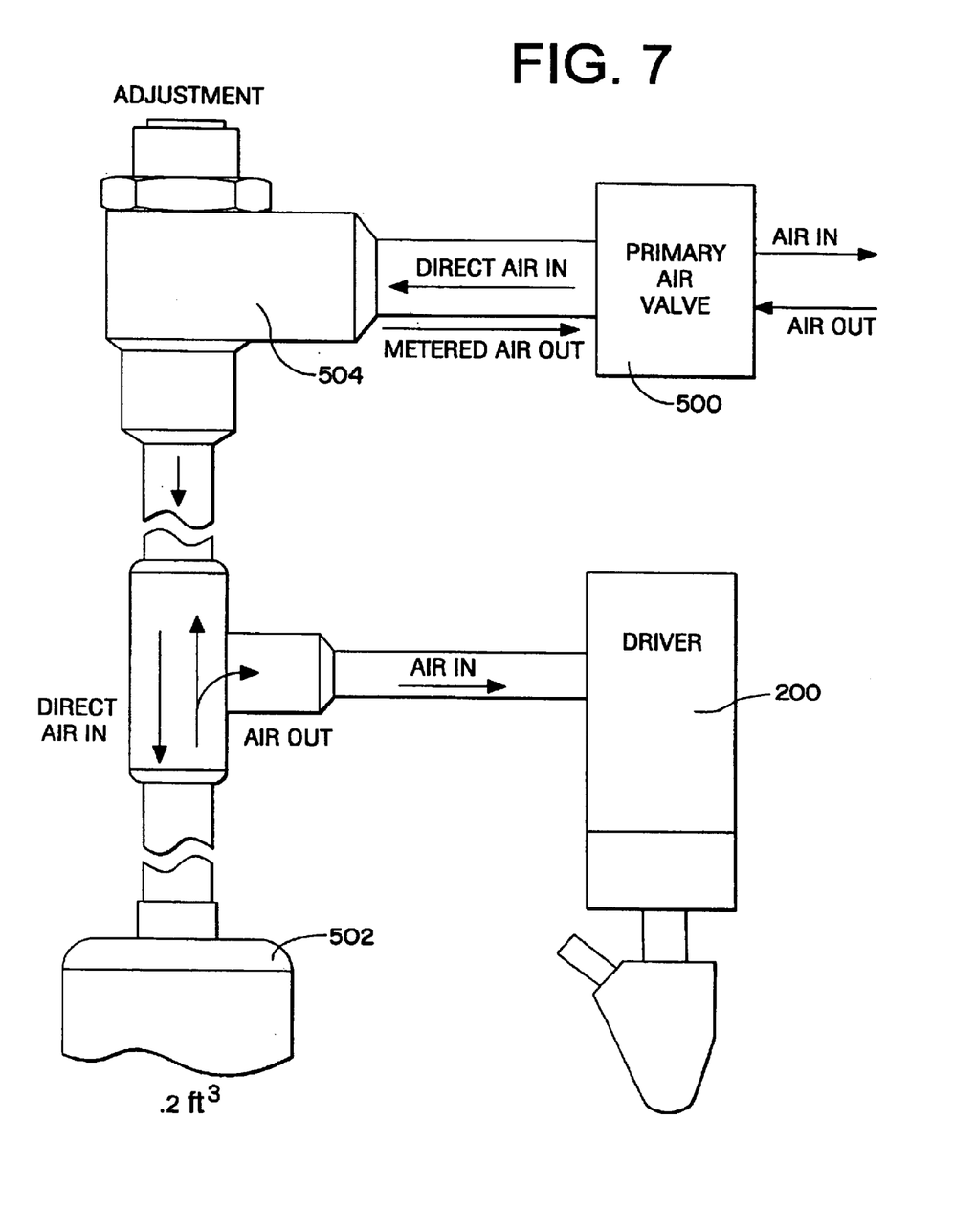
FIG. 7 is a schematic diagram of a pneumatic torque control system in accordance with an embodiment of the present invention.

The apparatus 100 also includes a torque control system for pneumatic drivers. Referring to FIGS. 3 and 7, each pneumatic driver 200 is in communication with a primary valve 500. The primary valve 500 is in communication with an air source (not shown) to control an intake of air flow to the driver 200. A canister 502 having a predetermined volume is connected to the primary valve 500, as shown in FIGS. 3 and 7. An adjustable air regulator 504 is connected to the canister 502. A sensor 506 is in communication with the driver 200 and in communication with an associated subcontroller of the driver 200. In operation, the sensor 506 communicates with the subcontroller to terminate the intake of air flow upon penetration of the fasteners into the fan shroud. The air regulator 504 regulates a flow rate of air from the canister 502 upon termination of intake air, thereby regulating torque generated by the pneumatic driver 200 in relation to the regulation of the flow rate of air from the canister 502. This torque control can prevent stripping associated with fasteners being over-torqued into the fan shroud.

Figure 8:
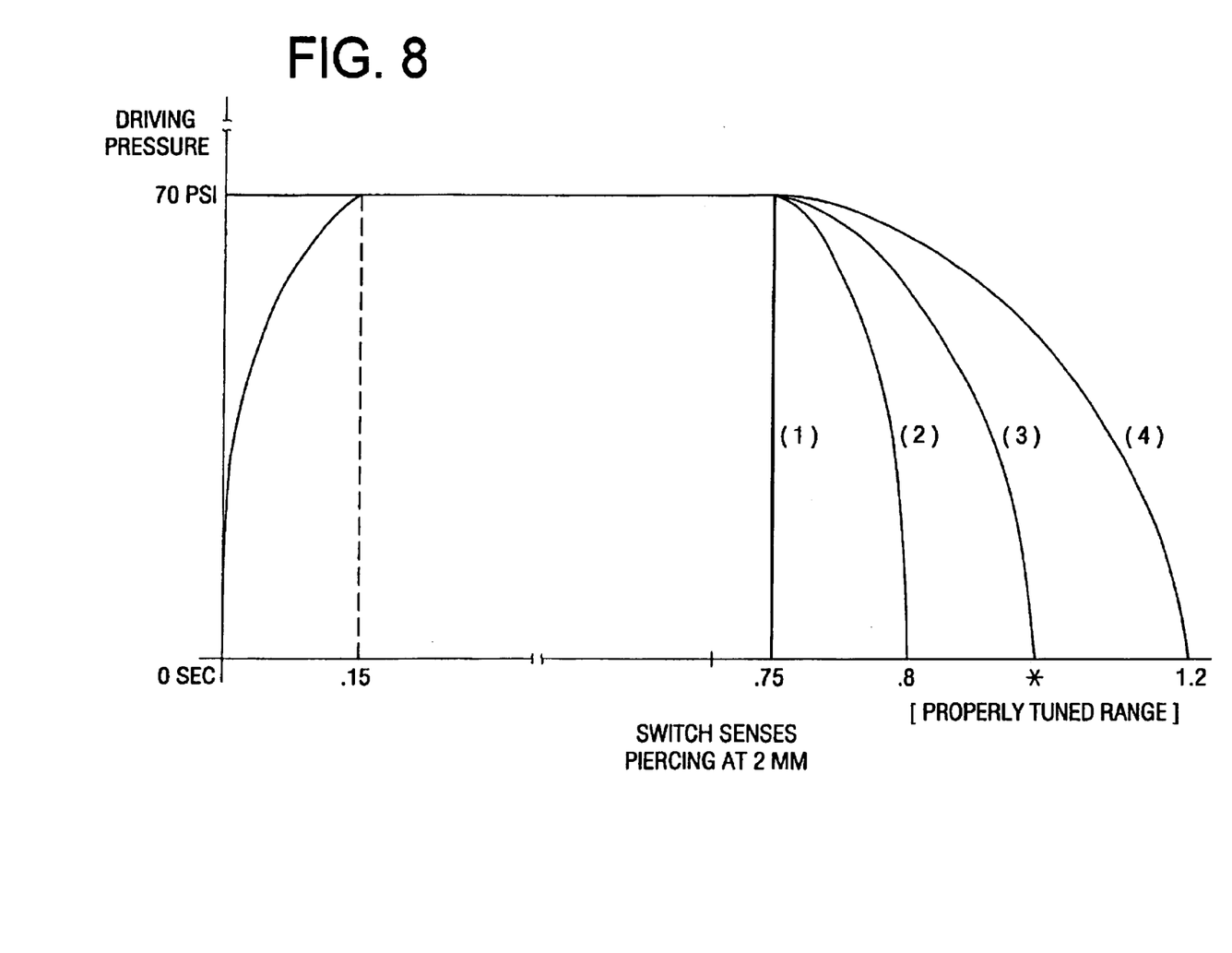
FIG. 8 is a graph depicting driving pressure vs. time in accordance with an embodiment of the present invention.

Various torques can be achieved based upon the rate of release of the air pressure as set by the adjustable air regulator 504 from the canister 502. Referring to the graph in FIG. 8, (1) indicates the effective pressure when no cannister 502 is used, which goes immediately to zero and (2), (3) and (4) show the preferred range of torque reduction over time which would effectively prevent over torquing at the end of the fastening process. Furthermore this adjustable feature allows for the torque range to be set for various fastener sizes and fan housing thicknesses.

While the specific embodiment has been illustrated and described, numerous modifications come to mind without significantly departing from the spirit of the invention and the scope of protection is only limited by the scope of the accompanying claims.

What is claimed is:

1. An apparatus for assembling a fan grill to a shroud of a fan housing, comprising:
   a support structure having a moveable carriage disposed in a horizontal plane, the moveable carriage configured to and carry the fan grill and shroud combination;
   a clamping structure moveably attached to the support structure and having clamps adapted to clamp the fan grill and shroud combination in a fixed position; and
   a plurality of automatic drivers attached to the clamping structure and moveable in a direction transverse to the horizontal plane of the carriage;
   wherein the automatic drivers drive a plurality of fasteners into the fan grill and shroud combination.

2. The apparatus of claim 1, wherein the moveable carriage is adapted to carry more than one fan grill and shroud combination to allow an operator to load a second fan grill and shroud combination onto the carriage while a first fan grill and shroud combination is engaged by the drivers.

3. The apparatus of claim 1, wherein each of the automatic drivers are independently controllable in relation to each other.

4. The apparatus of claim 1, further including a controller to control operation of the drivers.

5. The apparatus of claim 4, wherein the controller is a programmable logic controller (PLC).

6. The apparatus of claim 4, further including a plurality of sub-controllers to allow independent control of the drivers.

7. The apparatus of claim 6, wherein the controller and the sub-controllers are programmable logic controllers (PLCs).

8. The apparatus of claim 1, wherein the fan grill and shroud combination includes a second fan grill, the apparatus further including a second plurality of automatic drivers and clamps attached to a second clamping structure, the second plurality of drivers moveable in a direction transverse to the horizontal plane of the carriage to drive a plurality of fasteners into the second fan grill and shroud.

9. The apparatus of claim 8, wherein the clamps apply pressure to the first and second grills of the fan grill and shroud combination at generally the same time to compress the combination during driving of the fasteners.

10. The apparatus of claim 8, wherein each of the drivers is associated with:
    a control system;
    a canister having a fixed volume and in selective communication with an air source;
    an adjustable air regulator connected to the canister; and
    a sensor in communication with the pneumatic driver and in communication with the control system;
    wherein the sensor communicates with the control system to terminate communication of air flow to the cannister upon penetration of the fasteners into the fan shroud; and
    wherein the air regulator regulates a flow rate of air from the canister to the pneumatic driver upon termination of air flow to the cannister, thereby regulating torque generated by the pneumatic driver in relation to the regulation of the flow rate of air from the canister.

11. The apparatus of claim 10, wherein the torque of each driver is independently controlled.

12. An apparatus for assembling a fan, comprising:
    a support structure having a moveable carriage disposed in a horizontal plane, the moveable carriage configured to carry a first fan grill, a fan shroud, and a second fan grill of a fan assembly;
    a clamping structure moveably attached to the support structure in a direction transverse to the horizontal plane and having clamps adapted to clamp the fan assembly;
    a first plurality of automatic drivers attached to the clamping structure and moveable in a direction transverse to the horizontal plane;
    a second plurality of automatic drivers attached to the clamping structure and moveable in a direction transverse to the horizontal plane and generally opposite the movement direction of the first plurality of drivers;
    wherein the first set of automatic drivers drive a plurality of fasteners into the first fan grill while the second set of automatic drivers simultaneously drive a plurality of fasteners into the second fan grill.

13. The apparatus of claim 12, wherein the clamping structure comprises a first substructure and a second substructure, the first plurality of drivers being connected to the first substructure and the second plurality of drivers being connected to the second substructure.

14. The apparatus of claim 12, wherein the clamps engage the fan grills such that they are tensioned to fit the fan shroud.

15. An apparatus for assembling a fan comprising:
    a support structure having a moveable carriage disposed in a horizontal plane, the moveable carriage configured to carry a first fan grill, a fan shroud, and a second fan grill of a fan assembly;
    a plurality of clamps moveably attached to the support structure in a direction transverse to the horizontal plane of the carriage and adapted to clamp the fan assembly; and
    at least one automatic driver moveably attached to the support structure in a first direction transverse to the horizontal plane of the carriage; and
    at least one automatic driver moveably attached to the support structure in a second direction transverse to the horizontal plane of the carriage;
    wherein the automatic drivers simultaneously drive a plurality of fasteners into the fan grills from the first and second directions.

16. The apparatus of claim 15, wherein the plurality of clamps and the automatic drivers are attached to a clamping structure that is moveably attached to the support structure.

17. The apparatus of claim 16, wherein the clamping structure comprises a first substructure mechanically linked to a second substructure, the at least one automatic driver movable in the first direction being connected to the first substructure and the at least one automatic driver movable in the second direction being connected to the second substructure.

18. The apparatus of claim 15, further including a sensor in communication with at least one of the automatic drivers, the sensor capable of sensing a drive fault associated with at least one of the automatic drivers.

19. The apparatus of claim 18, further including an indicator that indicates when the sensor has sensed a drive fault.

20. The apparatus of claim 18, wherein the at least one driver associated with the drive fault will re-attempt to drive a fastener upon the occurrence of the drive fault.

21. The apparatus of claim 15, wherein the moveable carriage is adapted to allow an operator to load a first fan grill, a fan shroud, and a second fan grill of a second fan assembly onto the carriage while the first fan grill, the fan shroud, and the second fan grill of the fan assembly is engaged by the drivers.

22. The apparatus of claim 15, wherein each of the automatic drivers are independently controllable in relation to each other.

23. The apparatus of claim 15, further including a controller to control operation of the drivers.

24. The apparatus of claim 23, wherein the controller is a programmable logic controller (PLC).

25. The apparatus of claim 23, further including a plurality of sub-controllers to allow independent control of the drivers.

26. The apparatus of claim 25, wherein the controller and the sub-controllers are programmable logic controllers (PLCs).

27. The apparatus of claim 15, further including a feeder and an associated feed line in communication with at least one of the automatic drivers to automatically feed fasteners to the at least one of the automatic drivers.

28. The apparatus of claim 15, further including a sensor that is capable of sensing dimensional variations of the fan assembly.

29. A method of assembling a fan having a first fan grill, a shroud portion, and a second fan grill, the method comprising the steps of:

placing the first fan grill, the shroud portion, and the second fan grill onto a moveable carriage disposed in a horizontal plane of an assembly apparatus;

clamping the first fan grill and the second fan grill to the shroud portion in a direction transverse to the horizontal plane of the carriage;

engaging the first fan grill with at least one automatic driver in a first direction transverse to the horizontal plane of the carriage;

engaging the second fan grill with at least one automatic driver in a second direction transverse to the horizontal plane of the carriage;

driving a plurality of fasteners with the automatic drivers into the fan grills from the first and second directions.

30. The method of claim 29; wherein, the step of driving a plurality of fasteners into the fan grills includes driving the automatic drivers with pressurized air supplied to at least one canister in communication with at least one driver.

31. The method of claim 30; wherein, the step of driving the fasteners includes, providing a sensor in communication with the automatic drivers for terminating flow of pressurized air to the at least one canister upon penetration of the fasteners into the fan shroud.

32. The method of claim 31; wherein, the step of driving the fasteners includes, regulating the pressurized air from said at least one canister to thereby regulate torque generated by the pneumatic driver.

33. The method of claim 32; wherein, the step of driving the fasteners includes adjustably controlling the torque of each driver independently.

34. The apparatus of claim 1, wherein the plurality of automatic drivers are pneumatic drivers in communication with an air source.

* * * * *